(12) United States Patent
Baduge et al.

(10) Patent No.: US 10,768,039 B2
(45) Date of Patent: Sep. 8, 2020

(54) METHOD AND SYSTEM FOR STOCK MANAGEMENT

(71) Applicant: PANASONIC INTELLECTUAL PROPERTY MANAGEMENT CO., LTD., Osaka (JP)

(72) Inventors: Thilmee Baduge, Tokyo (JP); Ryuuichi Yatsunami, Fukuoka (JP); Yohei Kushido, Kanagawa (JP); Die Liu, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/341,811

(22) PCT Filed: Oct. 13, 2017

(86) PCT No.: PCT/IB2017/056381
§ 371 (c)(1),
(2) Date: Apr. 12, 2019

(87) PCT Pub. No.: WO2018/069894
PCT Pub. Date: Apr. 19, 2018

(65) Prior Publication Data
US 2019/0316952 A1 Oct. 17, 2019

Related U.S. Application Data

(60) Provisional application No. 62/408,429, filed on Oct. 14, 2016.

(51) Int. Cl.
*G01G 19/414* (2006.01)
*G01G 19/415* (2006.01)
*G06Q 10/08* (2012.01)

(52) U.S. Cl.
CPC ....... *G01G 19/4144* (2013.01); *G01G 19/415* (2013.01); *G06Q 10/087* (2013.01)

(58) Field of Classification Search
CPC .................................................. G01G 19/4144
USPC ........................... 235/383, 380, 492; 705/28
See application file for complete search history.

(56) References Cited

U.S. PATENT DOCUMENTS

2007/0016494 A1 1/2007 Brown et al.
2007/0069867 A1 3/2007 Fleisch et al.
2012/0310570 A1* 12/2012 Pyne ..................... G01G 19/42
702/65

(Continued)

OTHER PUBLICATIONS

Official Communication issued in International Patent Application No. PCT/IB2017/056381, dated Jan. 9, 2018.

(Continued)

*Primary Examiner* — Allyson N Trail
(74) *Attorney, Agent, or Firm* — Greenblum & Bernstein, P.L.C.

(57) ABSTRACT

A stock management method and system utilizes a mat that includes a plurality of sensors corresponding to a plurality of sensing areas, each of sensors is configured to sense an item placed on a certain sensing area. Partitions define a plurality of lanes on the mat. A controller receives sensing results of the plurality of the sensors and calculates a stock level of remained items on the mat based on the sensing results. One of the sensing areas is located in both of two lanes of the plurality of lanes.

15 Claims, 16 Drawing Sheets

(56) References Cited

U.S. PATENT DOCUMENTS

| | | | |
|---|---|---|---|
| 2016/0048798 A1* | 2/2016 | Meyer | G01G 21/22 |
| | | | 705/28 |
| 2017/0234746 A1* | 8/2017 | Cohen | G06F 3/0414 |
| | | | 73/1.08 |
| 2018/0204199 A1* | 7/2018 | Mohiuddin | G06Q 20/203 |
| 2019/0078930 A1* | 3/2019 | Ravulapati | G01G 19/42 |

OTHER PUBLICATIONS

Official Communication issued in International Patent Application No. PCT/IB2017/056381, dated Apr. 16, 2019.

* cited by examiner

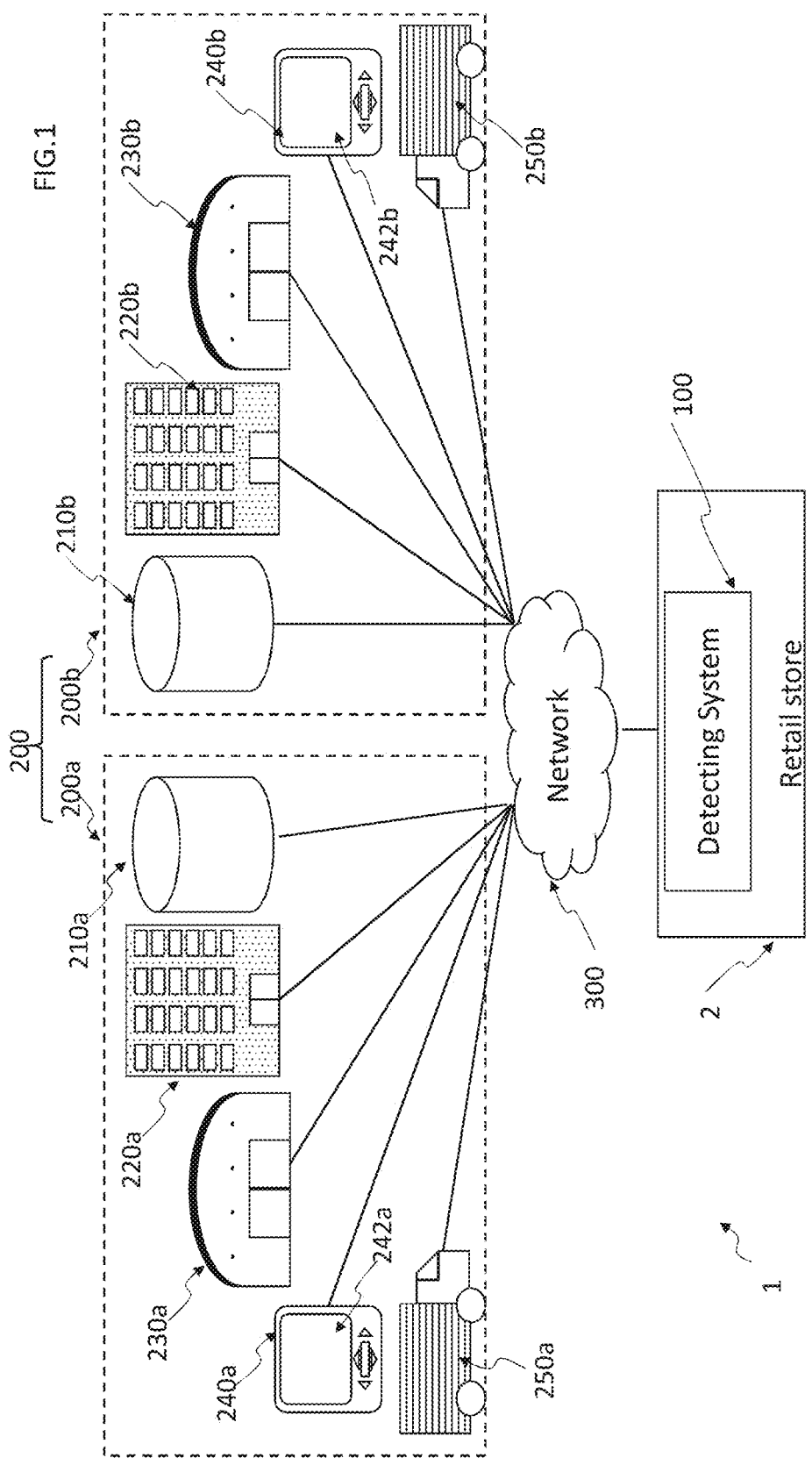

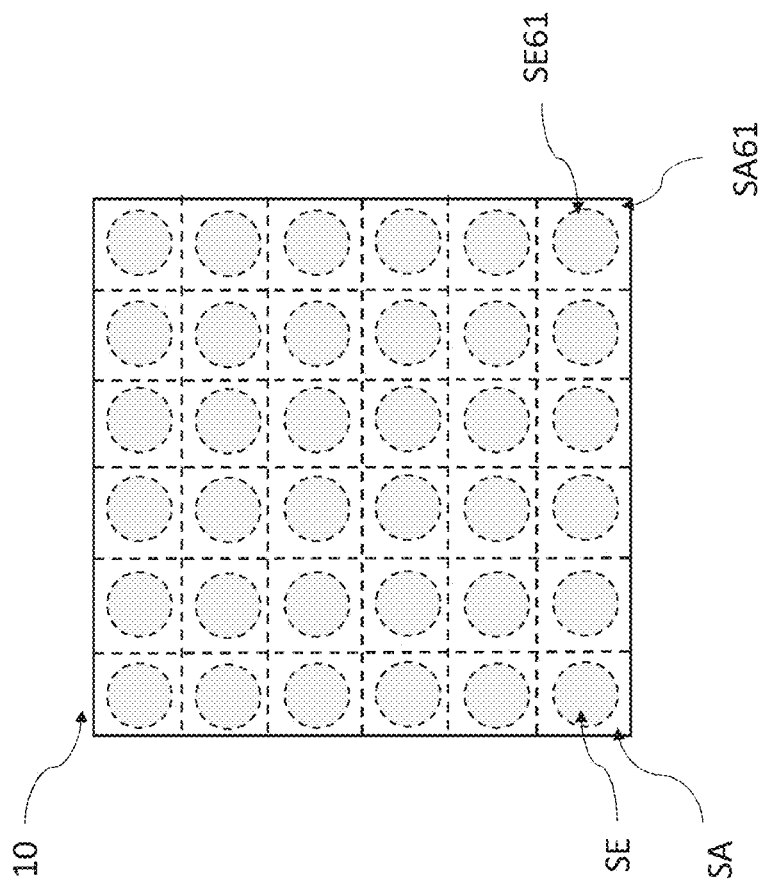

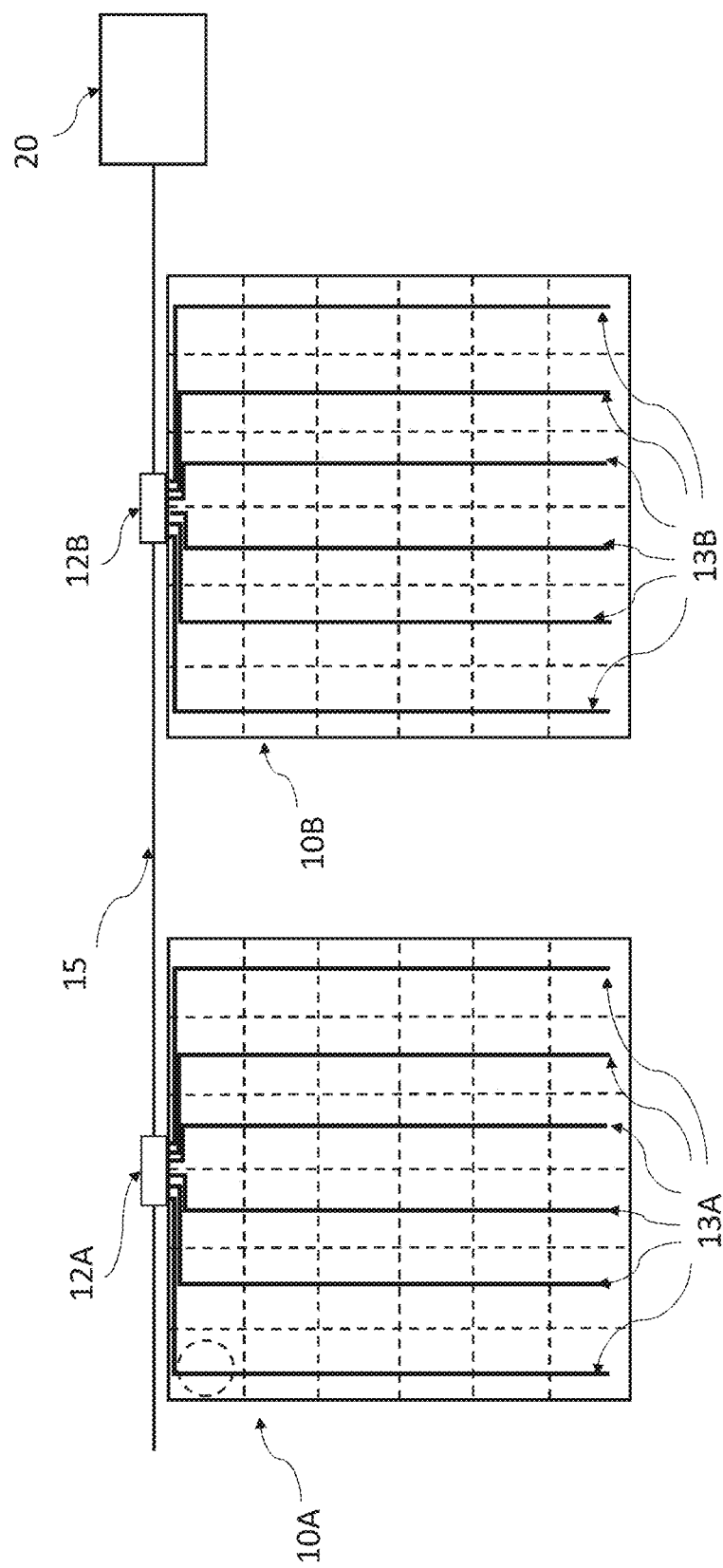

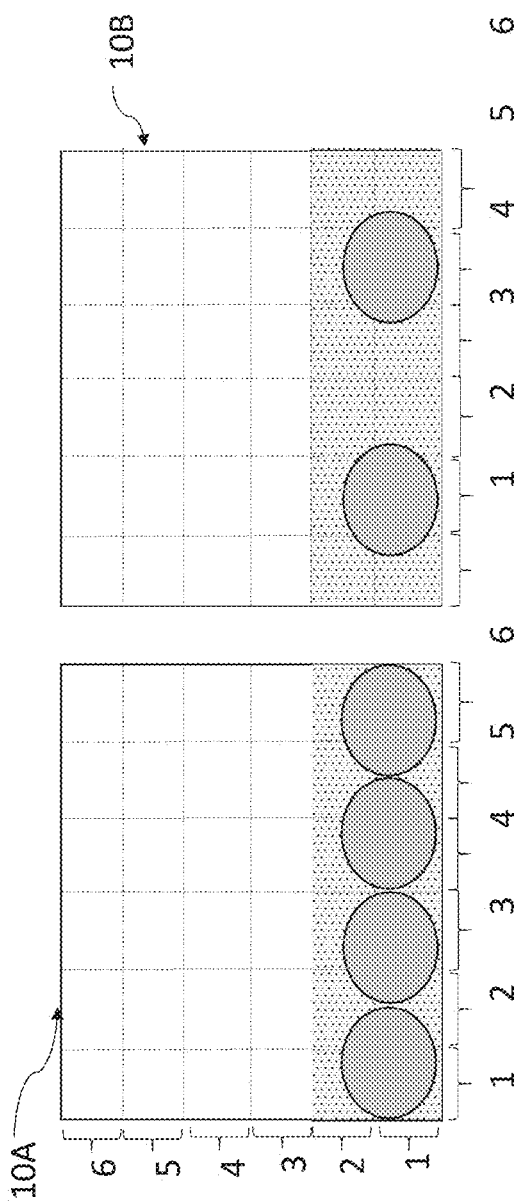

| Lane number | column numbers |
|---|---|
| 1 | 1,2 |
| 2 | 2,3 |
| 3 | 4,5 |
| 4 | 5,6 |

Fig. 11

METHOD AND SYSTEM FOR STOCK MANAGEMENT

CROSS-REFERENCE TO RELATED APPLICATIONS

The instant application is a PCT International Application claiming the benefit of U.S. provisional application No. 62/408,429 filed on Oct. 14, 2016, the disclosure of which is hereby expressly incorporated by reference in its entirety.

BACKGROUND

Field of the Disclosure

The present disclosure relates to stock management system. More particularly, the present disclosure relates to counting stocks with sensors.

SUMMARY

A stock management system, comprising: a mat that includes a plurality of sensors corresponding to a plurality of sensing areas, each of sensors is configured to sense an item placed on a certain sensing area; partitions that define a plurality of lanes on the mat; a controller that receives sensing results of the plurality of the sensors and calculates a stock level of remained items on the mat based on the sensing results; wherein one of the sensing areas is located in both of two lanes of the plurality of lanes.

A stock management system, comprising: a processor; a memory storing instructions, that when executed by the processor, cause the processor to perform operations including: receiving sensing results by sensors arranged in an array including rows and columns, each sensor sensing an item placed on each sensing area, a bottom plane of the item being greater than the sensing area; calculating the number of items placed on the sensors in accordance with the received sensing results including positive sensing results, the calculated number of the items being fewer than positive sensing results, included in the received results, each indicating that an item is on a sensor.

A stock management system, comprising: a processor; a memory storing instructions, that when executed by the processor, cause the processor to perform operations including: receiving sensing results by sensors arranged in an array including rows and columns, each sensor sensing an item placed on each sensing area, an area of the item being greater than the sensing area; calculating the number of items placed on the mat in accordance with received results, the calculated number of the items being less than positive sensing results included in the received results and indicating that an item is on one of sensors.

BRIEF DESCRIPTION OF THE DRAWINGS

FIG. 1 shows an overview of stock management system, according to an aspect of the present disclosure.

FIG. 2 shows an exemplary stock detection mat overview, according to an aspect of the present disclosure.

FIG. 4 shows an exemplary multiple mats connected to a mat controller, according to an aspect of the present disclosure.

FIG. 6(a) shows an exemplary illustration of positive sensing areas in two cases, according to an aspect of the present disclosure.

FIG. 6(b) shows a table indicating the number of counted items and positive sensing areas.

FIG. 11 shows an exemplary lane area table indicating lane numbers and column numbers, according to an aspect of the present disclosure.

DETAILED DESCRIPTION

Figure 3B:
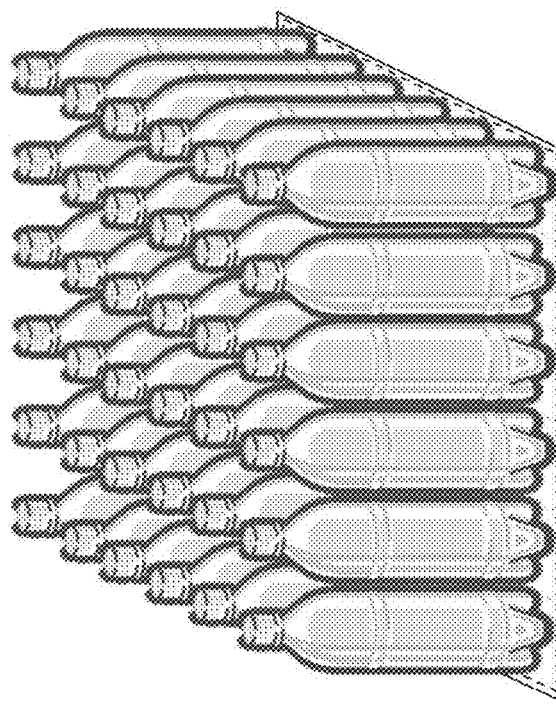
FIG. 3(b) shows an exemplary stock detection mat with items in a side view, according to an aspect of the present disclosure.

In view of the foregoing, the present disclosure, through one or more of its various aspects, embodiments and/or specific features or sub-components, is thus intended to bring out one or more of the advantages as specifically noted below.

Methods described herein are non-limiting illustrative examples, and as such are not intended to require or imply that any particular process of any embodiment be performed in the order presented. Words such as "thereafter," "then," "next," etc. are not intended to limit the order of the processes, and these words are instead used to guide the reader through the description of the methods. Further, any reference to claim elements in the singular, for example, using the articles "a," "an" or "the", is not to be construed as limiting the element to the singular.

Referring to the drawings wherein like characters represent like elements, FIG. 1 is an overview of stock management system 1, according to an aspect of the present disclosure. The stock management system 1 have a detecting system 100 and a deliverer 200 connected to the detecting system 100 through the network 300. The detecting system 100 is installed in a retail store 2 and communicates to the deliverer 200 through the network 300. The deliverer 200 deliveries foods or drinks to the retail stores 2. Detecting system 100 detects stock status (e.g. the number of products on a shelf) of each food or drink in the retail store 2. Then the detecting system 100 transmits stock information, including alert, table or chart, based on the stock status detected by the detecting system 100 through the network 300. Thus deliverer can recognize the stock status upon receiving the stock information. The stock management system 1 may have a plurality of the detecting systems 100, each of which is installed in different retail stores 2 and transmits the stock information to the deliverer 200.

The deliverer 200 receives the stock information from the detecting system 100. The deliverer 200, for instance, corresponds to manufacturer 200a or a delivery company 200b. The manufacturer 200a distributed their products (e.g. foods or drinks) to the retail stores 2. The products are displayed on shelves in the retail store 2 and bought by customers visiting the retail store 2. Thus, it is better for the manufacturer 200a and the retail store 2 to be displayed the products on the shelves at all times during opening hours of the retail store 2 in order to maintain sales opportunities.

Although it depends on business of between the retail store 2 and the manufacturer 200a, the manufacturer 200a displays their products in the retail store 2 by themselves in one of the business between them. In other words, a member of the manufacturer 200a visits the retail store 2, then displays and restocks the products or replaces new products on the shelves. However an employee or the representative of the manufacturer 200a does not basically work at the retail store 2 in general because the retail store 2 and the manufacturer 200a are different companies and have infrequent locations. Thus the detecting system 100 transmits the stock information to the manufacturer 200a for noticing the stock status. In other words the stock information is transmitted to at least one of devices or facilities, belonging to the manufacturer 200a, including at least one of a server 210a, an office 230a, mobile terminal 240a with a display 242a or a distribution vehicle 250a through the network 300. As a result, the manufacturer 200a can remotely determine whether they should deliver their products to the retail store 2 today or in a few days.

The server 210a is managed by the manufacturer 200a and stores several data related to the manufacturer 200a. The office 220a is a work place for members of the manufacturer 200a. Also, devices (e.g. desktop computers, laptop computers, mobile terminals, or the like) in the office 220a receive the stock information from the detecting system 100. The warehouse 230a houses or stores the products produced by the manufacturer 200a. Also, devices (e.g. desktop computers, laptop computers, mobile terminals, or the like) in the warehouse 230a receive the stock information from the detecting system 100. The mobile terminal 240a may be owned by the manufacturer 200a and assigned to a member of the manufacturer 200a. The mobile terminal 240 may display the stock information on the display 242a upon receiving it. Also, the mobile terminal 240 may be owned personally by a member of the manufacturer 200a. The distribution vehicle 250a (e.g. truck) is used to deliver the products of the manufacturer 200a to the retail store 2. Devices (e.g. mobile terminal powered by a battery or the distribution vehicle 250a) receive the stock information through the network 300. Further one of the server 210a, devices in the office 220a or the warehouse 230a, the mobile terminal 240a, the distribution vehicle 250a may transmit the stock information to another one of them upon receiving the stock information. For example, the server 210a transmits the stock information or arranged information based on the stock information to the mobile terminal 240a through the network 300.

In the same manner, the delivery company 200b may receive the stock information as the deliverer 200. In one of embodiments, the delivery company 200b receives a job offer for delivering the products to the retail store 2 from the manufacturer 200a through the network 300. In other words, the delivery company 200b delivers the products of the manufacturer 200a in response to orders or commands from the manufacturer 200a. In another one of embodiments, the delivery company 200b receives a job offer delivering the products to the retail store 2 from the retail store 2 through the network 300. In other words, the delivery company 200b delivers the products of the manufacturer 200a in response to orders or commands from the retail store 2.

The delivery company 200b has at least one of a server 210b, an office 220b, a warehouse 230b, mobile terminal 240b with a display 242b or a distribution vehicle 250b similar to the manufacturer 200a.

Further, the detecting system 100 may transmit the stock information to both the manufacturer 200a and the delivery company 200b. Alternatively the detecting system 100 may select a destination of stock information of each product in accordance with a brand or a maker of each product.

FIG. 2 shows an exemplary stock detection mat overview, according to an aspect of the present disclosure. A stock detection mat 10, as a portion of the detecting system 100, is configured to detect items placed on the mat 10 by an array sensor including sensors SE. The mat 10 includes thirty-six (6×6) sensors SE corresponding to thirty-six (6×6) sensing areas SA, one of which corresponding to a minimum individual detection area. Each of the sensors SE is located within each of the detection (sensing) areas SA. Thereby the array sensor including 6 columns (x-axis) and 6 rows (y-axis) is configured on the mat 10. Each of the sensors SE senses an item on the sensing area SA. As a specifically example, the sensor SE61, in the sensing area SA61 which is located in a column 6 and a row 1, senses an item if the item is on the sensing area SA61. In other word, the sensor SE, having certain coordinates, detects an item placed on the sensing area SA having the certain coordinates.

Figure 3A:
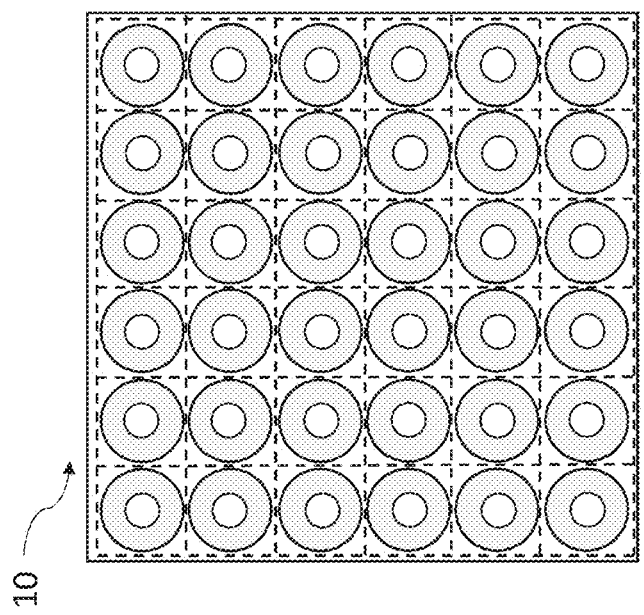
FIG. 3(a) shows an exemplary stock detection mat with items in a top view, according to an aspect of the present disclosure.

FIG. 3(a) shows an exemplary stock detection mat with items in a top view, according to an aspect of the present disclosure. FIG. 3(b) shows an exemplary stock detection mat with items in a side view, according to an aspect of the present disclosure. In FIGS. 3(a) and 3(b), thirty-six items (bottles) arranged in an array such that the arrayed items correspond to arrayed sensing areas SA. As shown in a top view of FIG. 3(b), each item placed on the mat 10 is smaller than each sensing area SA. The mat 10 detect thirty-six items with thirty-six sensors SE.

FIG. 4 shows an exemplary multiple mats connected to a mat controller, according to an aspect of the present disclosure. The mat 10A and 10B, including the same functions and configurations as the mat 10 described above, are connected via a connecting cable 15 in parallel via mat connector 12A and 12B. The mat connector 12A (or 12B) is connected to sensors SE via six conductive lines 13A (or 13B) each of which is extended onto one of columns. Thus the sensors SE on the same column are connected to the mat connector 14A (or 14B) in direct with one conductive line 13A (or 13B). A mat controller 20 is also connected to the connecting cable 15, then receives results by the sensors SE in the mat 10A and 10B via the conductive lines 13A and 13B, the mat connector 14A and 14B, and the connecting cable 15. Thus the mat controller 20 controls a plurality of the mats 10 (10A and 10B) and collects results by sensors SE included in the mats 10 (10A and 10B) connected to the mat controller 20. The mat controller 20 is notified of the results including positive results and negative results in real-time, the positive results indicating the item is on the sensor SE and the negative results indicating the item is not on the sensor SE. Therefore, the mat controller 20 has an information for mat status indicating which the sensing areas SE are positive or negative. The mat controller 20 may calculate stock level of items (e.g., the number of the items) on the mats 10 or transmit the information for the mat status to another device.

Figure 5:
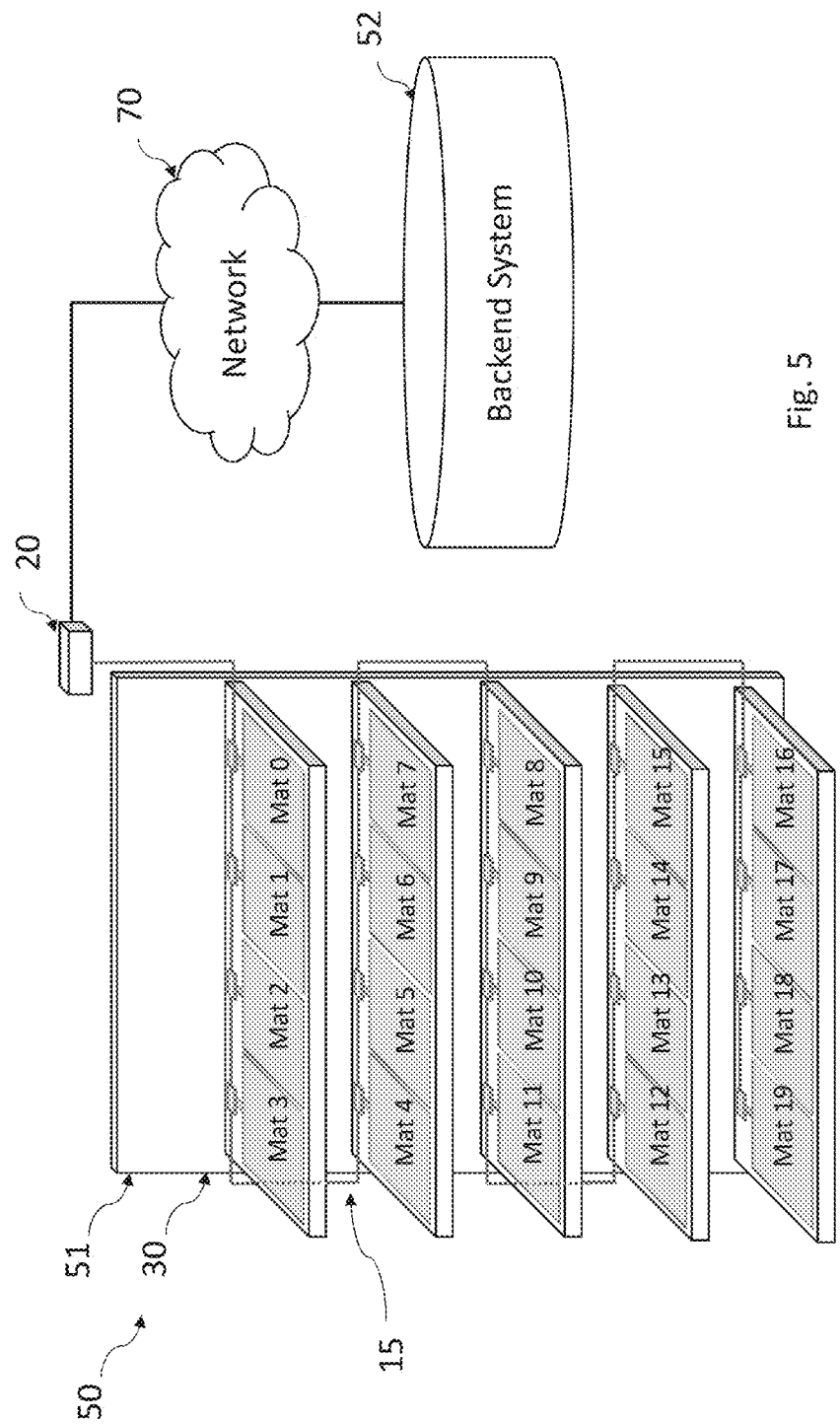
FIG. 5 shows an exemplary stock management system having multiple mats on a shelf, according to an aspect of the present disclosure.

FIG. 5 shows an exemplary stock management system having multiple mats on a shelf, according to an aspect of the present disclosure. A stock management system 50 includes a stock detection system 51 and a backend system 52 connected to the stock detections system 51 via a network 70 which may be a wired network, a wireless network or a combination thereof. The stock detection system 51 attached on a shelf 30, which may be in a retail store, includes twenty mats 10 being connected to one mat controller 20 in parallel via the connecting cable 15. The shelf 30 has five shelf-boards on which four-mats 10 are arranged. Thus the stock detection system 51 detects stocks on five shelf-boards with a single mat controller 20 receiving detection results by all of sensors SE of twenty mats 10. The stock detection system 51 detects and stores stock information with respect to stock level or the results by the sensors SE, then transmits the stored stock information to the backend system 52. The backend system 52 may collect information from a plurality of stock detection systems 51 which may be installed in different retail stores.

Accordingly, the stock information, obtained by one or more stock detection systems 51, may be shared with the stock management system 50 by using the mat 10 on which detects items. However, items which placed on the mat 10 could have several sizes in case that an operator or a provider of the stock management system 50 uses common mats 10 to several kinds of items (for example, in order to reduce costs of the mat 10). If so, a bottom size of one item might be larger than one sensing area SA, but a bottom size of another item might be smaller than one sensing area. If the bottom size of item is larger than one sensing area SA, the item can be on two or more sensing areas SA. In this case, the actual number of placed items on the mat 10 could be different from the number of positive sensing areas.

FIG. 6(a) shows an exemplary illustration of positive sensing areas in two cases, according to an aspect of the present disclosure. FIG. 6(b) shows a table indicating the number of counted items and positive sensing areas, according to an aspect of the present disclosure. Four-items are placed on the mat 10A and two-items are placed on the mat 10B. However, in each the mat 10A and 10B, many sensors SE, of which the number is more than the number of actually placed items, detect items. In detail, in the mat 10A, twelve-sensors SE detecting items have coordinates (1, 1), (1, 2), (2, 1), (2, 2), (3, 1), (3, 2) (4, 1), (4, 2), (5, 1), (5, 2), (6, 1) and (6, 2) despite four-items on the mat 10A. In the mat 10B, twelve-sensors SE detecting items have, similarly, coordinates (1, 1), (1,2), (2, 1), (2, 2), (3, 1), (3, 2) (4, 1), (4, 2), (5, 1), (5, 2), (6, 1) and (6, 2) despite two-items on the mat 10B. Therefore, even though both results by the mats 10A and 10B are the same, twelve-sensors SE are positive, the actual number of items could be different.

Therefore, a calculation and/or a presumption based on results by the sensors SE are required to know an actual stock level (e.g., the number of items on which the mat 10 is) because a relation between the number of items on the mat 10 and the number of positive results by sensors SE are not one-to-one. As hereinafter explained, partitions separating places on the mat 10 are used for calculating and/or presuming the actual number. Thereby, the operator or the provider can use one format of the mat 10 for different types of items.

Figure 7A:
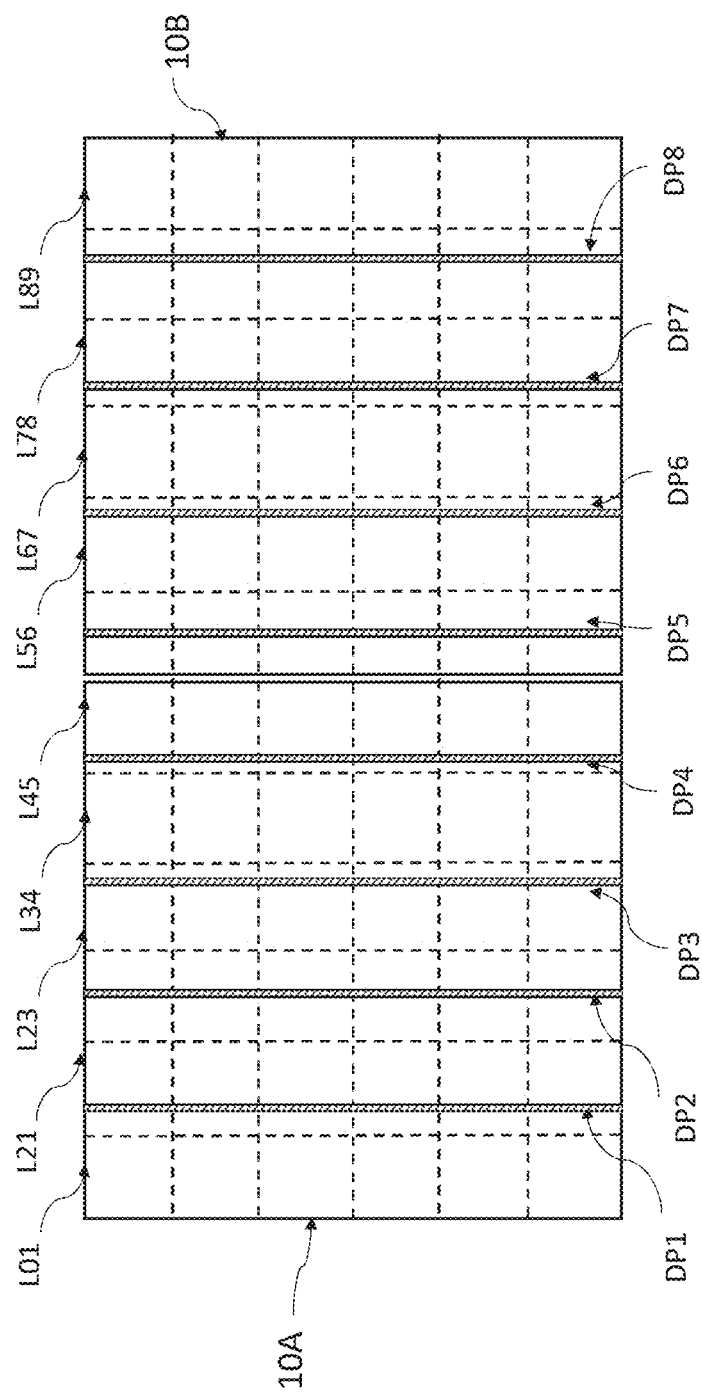
FIG. 7(a) shows an exemplary mat with display partitions (top view), according to an aspect of the present disclosure.
Figure 7B:
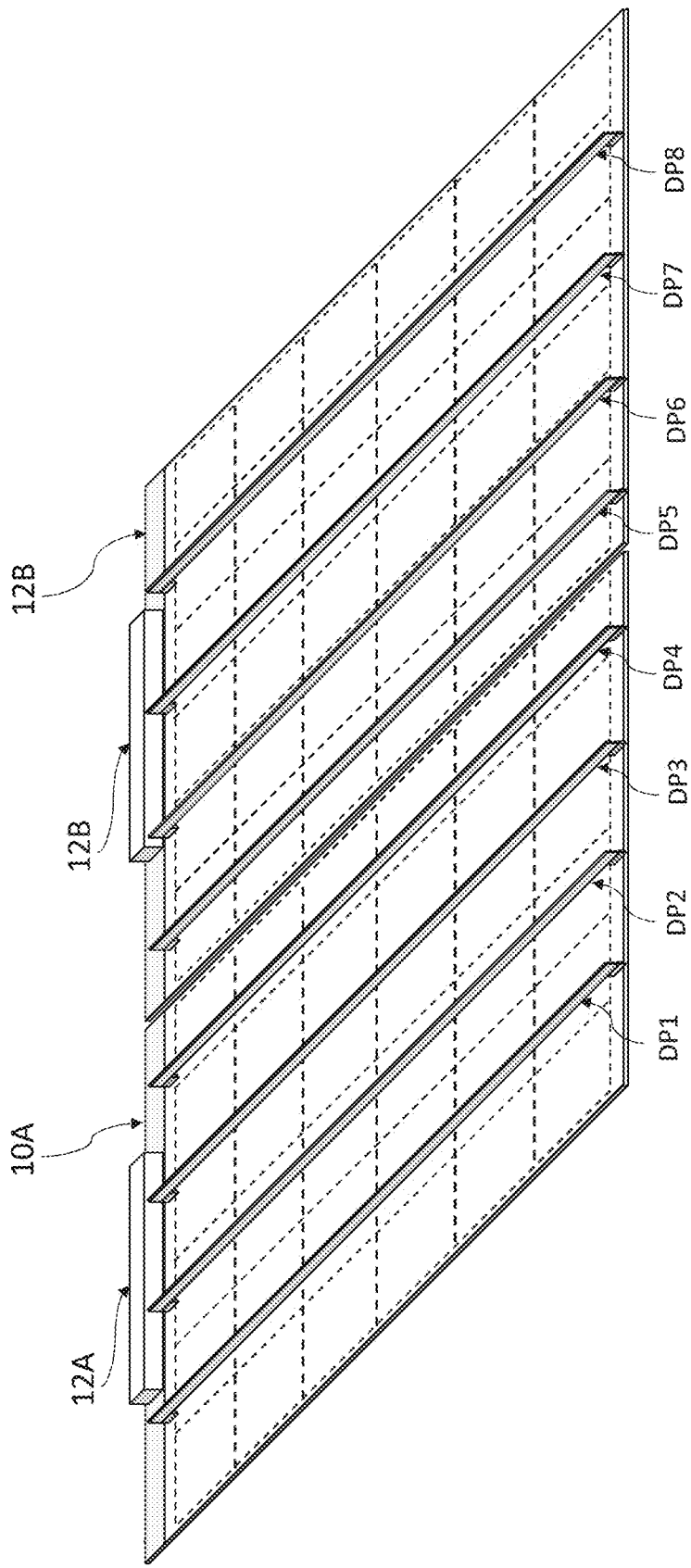
FIG. 7(b) shows an exemplary mat with display partitions (3D view), according to an aspect of the present disclosure.

FIG. 7(a) shows an exemplary mat with display partitions (Top view), according to an aspect of the present disclosure. FIG. 7(b) shows an exemplary mat with display partitions (3D view), according to an aspect of the present disclosure. As shown in FIGS. 7(a) and 7(b), the shelf 30 includes display partitions DP1-DP8 which define lanes L01-L89. In detail, the lane L01 is a left side of the partitions DP1, the lane L12 is between the partition DP1 and DP2, the lane L23 is between the partition DP2 and DP3, the lane L34 is between the partition DP3 and DP4, the lane L45 is between the partition DP4 and DP5, the lane L56 is between the partition DP5 and DP6, the lane L67 is between the partition DP6 and DP7, the lane L78 is between the partition DP7 and DP8, the lane L89 is a right side of the partition DP8. The partitions DP1-DP8 may be movable in a row direction to determine arbitrarily a width of each lane for fitting any shape of items. In this manner the width of each lane is adjustable. In case of FIGS. 7(a) and 7(b), the width of each lane is larger than the width of sensing area SA. Thus there are two-or-more-columns of sensors SE in one lane. Parts of columns are located under the partitions DP1-8 and belongs to two-lanes being next to each other. But sensors SE on these columns do not touch with the partitions DP1-8. The both ends of partitions DP1-8 are fixed by any other portion except for the sensing areas SA. FIG. 7(b), the partitions DP1-8 are fixed to an area being outside of the sensing areas SA in the mat 10.

Figure 8:
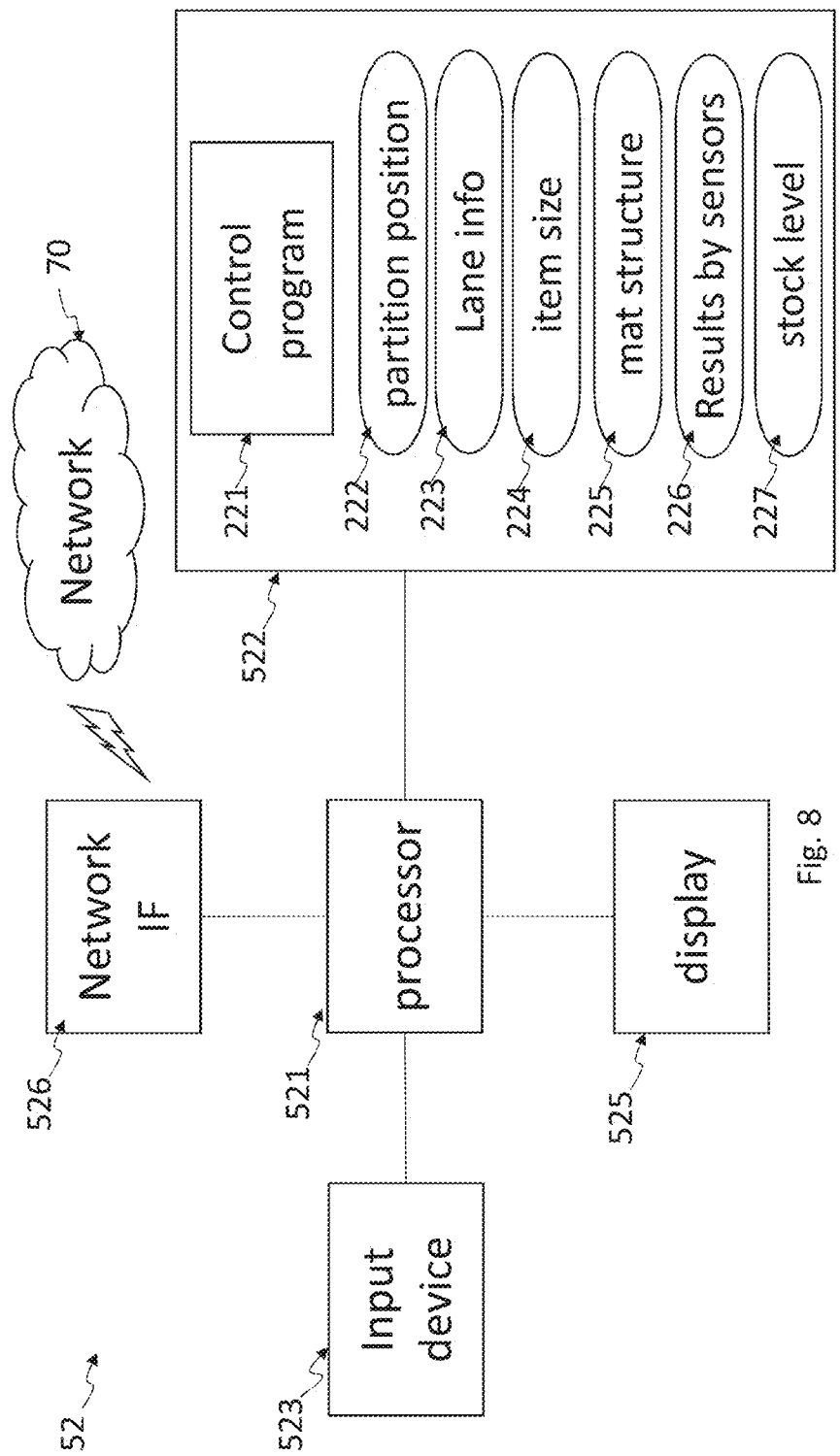
FIG. 8 shows an exemplary schematic of a backend system, according to an aspect of the present disclosure.

FIG. 8 shows an exemplary schematic of a backend system, according to an aspect of the present disclosure. The backend system 52 includes a processor 521, a memory 522 storing at least a control program 221, an input device 523, a display 525 and a network IF 526. The control program 221 causes the processor to perform operations. The memory 522 may further store a partitions position 222, lane information 223, an item size 224, a mat structure 225, results by sensors 226 and a stock level 227. The partitions position 222 is input via the input device 523 in response to a user input, and indicates each position for the partitions DP1-8 with respect to the mat 10. The lane information 223 indicate each width of lane based on the partition position 222 and the number of lanes. The item size 224 indicates length in a longitudinal direction parallel to the partitions DP1-8 and/or in a transverse direction perpendicular to the partitions DP1-8, for each item. The mat structure 225 indicates a structure of the mat 10 such as two dimension coordinates (the number of rows and columns), a size of a single mat 10, a size of a single sensing area SA, like that. The results 226 is transmitted from the stock detection system 51 via the network 70 and received by the network IF 526 and the processor 521. The stock level 227 indicates an actual level for remaining stocks on the shelf 30 or in a store having the shelves 30. The processor 521 calculates the stock level 227 in accordance with the results 226 and stores the calculated stock level 227 in the memory 522. The display 525 may display at least one of the partitions position 222, the lane information 223, the item size 224, the mat structure 225, the results by sensors 226 and the stock level 227.

Figure 9:
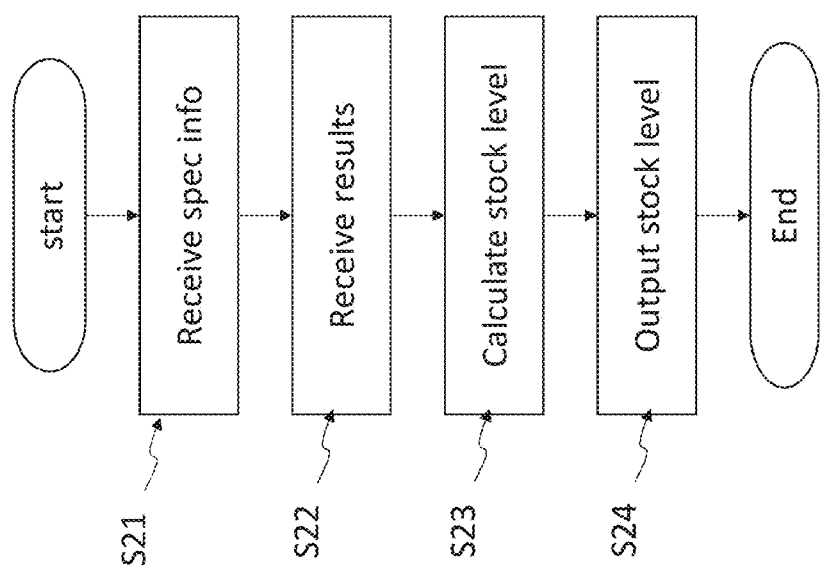
FIG. 9 shows an exemplary flowchart of a backend system, according to an aspect of the present disclosure.

FIG. 9 shows an exemplary flowchart of a backend system, according to an aspect of the present disclosure. In step S21, the processor 521 receives, from the input device 523, spec information with respect to the stock detection system 51, the spec information including at least the partition position 221 and the item size 224. Then the processor 521 calculates the lane information 223 based on the received partition position 222. In step S22, the processor 521 receives the results 226, via the network IF 526, transmitted from the stock detection system 51 via the network 70, and stores them in the memory 522. In step S23, the processor 521 calculates the stock level 227 based on the partition position 222, the lane information 223, the item size 224, the mat structure 225 and the results 226. In step S24, the processor 521 outputs the stock level 227 to another device (e.g., the display 525). The processor 521 may transmit the stock level 227 to another device via the network 70.

As mentioned above, the stock level 227 calculated by the processor 521 may include the number of items on the mat(s) 10 (or the shelf 30) or the number of positive sensing areas on the mat(s) 10. Further the stock level 227 may include rate of remain items to maximum items can be placed on the mat(s) 10 (or the shelf 30) or rate of positive sensing areas to the maximum. In addition, in order to calculate the stock level 227, the processor 521 may eliminate results by the sensors located in a specific column (e.g., under one of the partitions DP1-8). In other words, for calculating the stock level 227, the processor 521 may select some of results by sensors and ignore other of results by sensors based on positions of sensors. For instance, sensors in a first column are placed in a single lane such as sensors SE in the most-left column in FIGS. 7(a) and 7(b), results by those sensors in the first column are used for calculating the stock level 227. In contrast, sensors in a second column are placed in both two lanes such as sensors SE in the second-left column in FIGS. 7(a) and 7(b), results by those sensors in the second column are not used for calculating the stock level 227. In addition the processor 521 may consider a length of the mat 10 in a column (y) direction and a length of an item in a column (y) direction when calculating the number of or the rate of the items.

Figure 10:
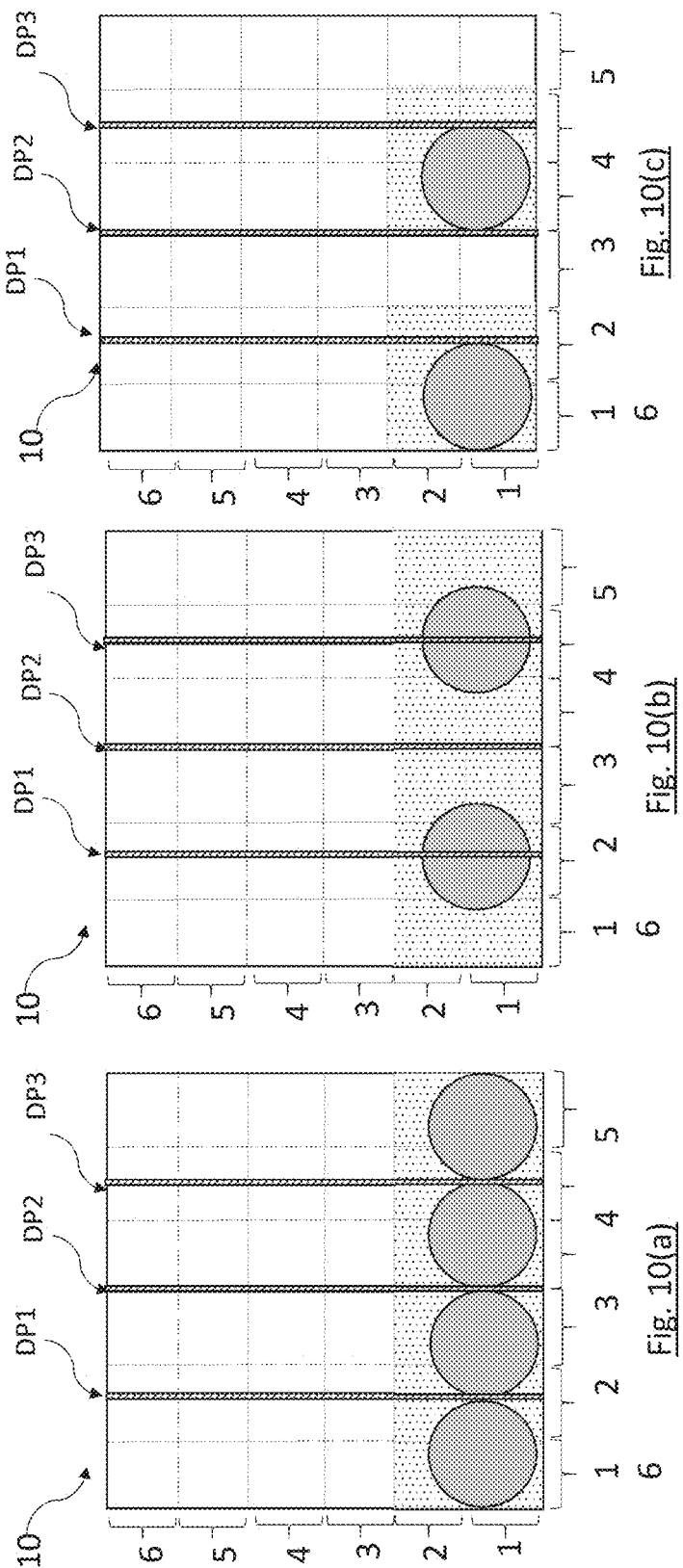
FIGS. 10(a)-10(c) show an exemplary illustration for eliminating an item counting error with display partitions, according to an aspect of the present disclosure.

FIG. 10 shows an exemplary illustration for eliminating an item counting error with display partitions, according to an aspect of the present disclosure. In FIGS. 10(a) and 10(b), the same sensing areas SA are positive, but it is not possible to place two-items like FIG. 10(b) because of the partitions DP1-3. Accordingly, if the processor 521 of the backend system 52 receives results by the sensors SE such as FIG. 10(a) or 10(b), the processor 521 outputs "four", instead of "two", as the actual number of items on the mat 10. The output "four" is a part of the stock level 227 in light of positions of the partitions DP1-3. As another example, in FIG. 10(c), sensors SE having coordinates (1, 1), (1, 2), (2, 1) and (2, 2) are positive. However the processor 521 outputs "two" as the actual number of items on the mat 10 in light of positions of the partitions DP1-3 and negative sensors SE having coordinates (3, 1), (3, 2), (6, 1) and (6, 2).

Figure 12:
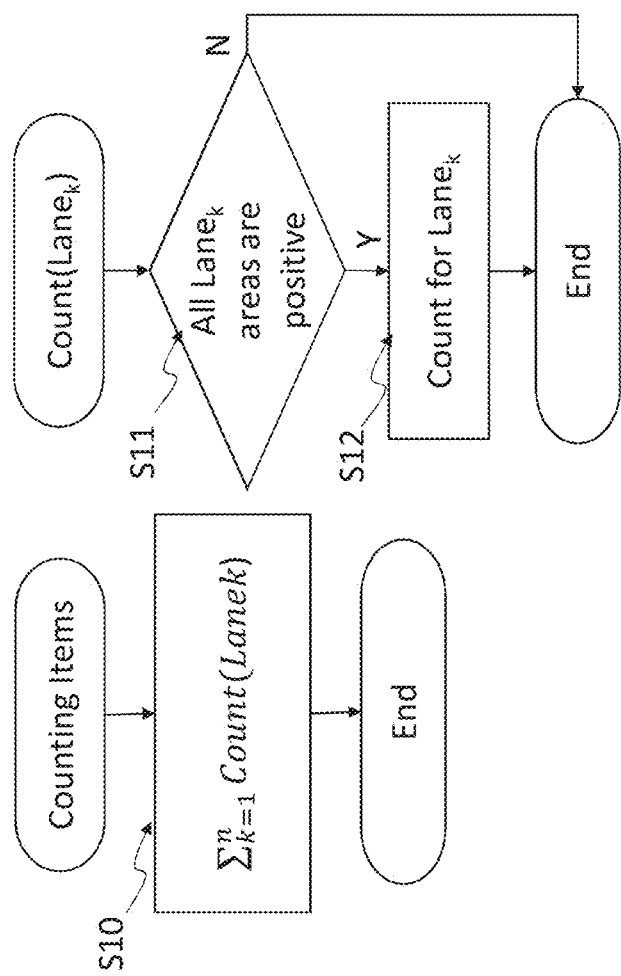
FIG. 12 shows an example flowchart for calculating a stock level, according to an aspect of the present disclosure.

FIG. 11 shows an exemplary lane area table indicating lane numbers and column numbers, according to an aspect of the present disclosure. The table shown in FIG. 11 corresponds to the mat 10 and partitions DP1-3 shown in FIG. 10(a)-10(c). The lane areas table defines relations between lane numbers and corresponding x axis area numbers (columns). FIG. 12 shows an example flowchart calculating a stock level. The processor 521 calculates the stock level by using a lane areas table corresponding to the lane information 223. In addition, step S11 and step S12 shows detail procedures of step S10. In step S1, if all of sensing areas SA in $Lane_k$ is positive, the processor 521 counts for the $Lane_k$. For example, in case of k=1, the processor 521 checks sensing areas SA of columns 1 and 2.

Figure 13:
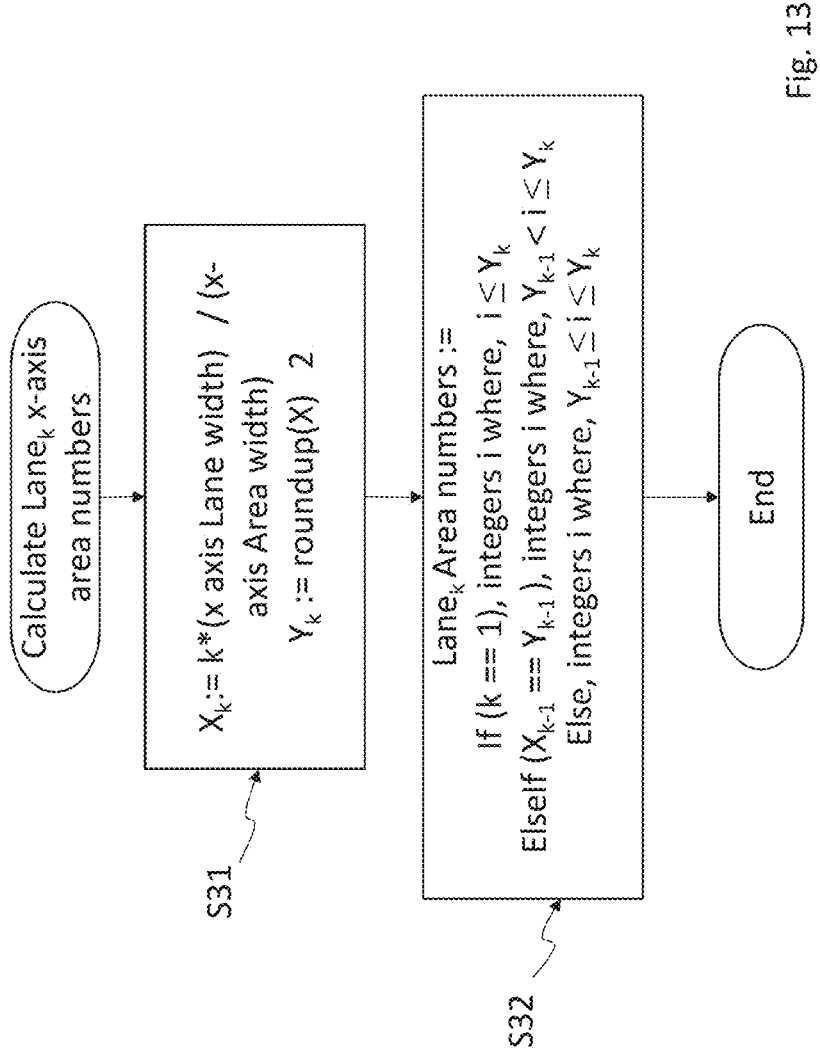
FIG. 13 shows an exemplary flowchart for lane area number calculation, according to an aspect of the present disclosure.

FIG. 13 shows an exemplary flowchart for lane area number calculation, according to an aspect of the present disclosure. Steps S31 and S32 show how to generate the lane areas table shown in FIG. 11.

Figure 14:
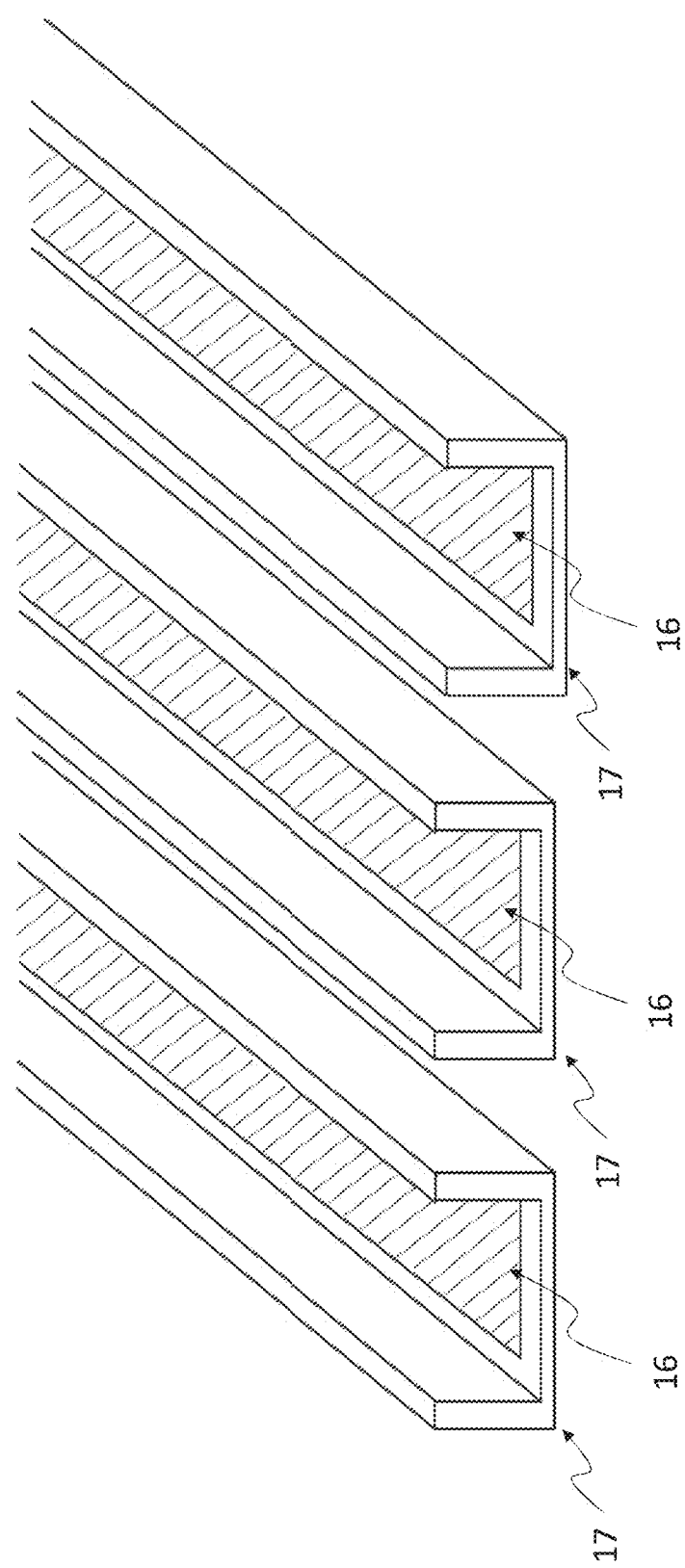
FIG. 14 shows an exemplary detection mat stripes over x-axis expansible trays, according to an aspect of the present disclosure.

FIG. 14 shows an exemplary detection mat stripes over x-axis expansible trays, according to an aspect of the present disclosure. FIG. 13 shows another example of the stock detection system 51 with expansible trays 17 and mats 16. The mats 16 are substantially same as the mat 10 described above, however, narrower than the mat 10. That is, the number of columns of the mat 16 is one or two (less than six). The mats 16 are connected to mat controller 20 for transmitting their results. Side edges of the expansible trays 17 are expansible in a width direction for adjusting a width thereof and fitting the width to different types of items. Thereby the expansible tray 17 can be used for different items each having a different width. In addition the expansible tray 17 is connectable with another expansible tray 17.

Figure 15:
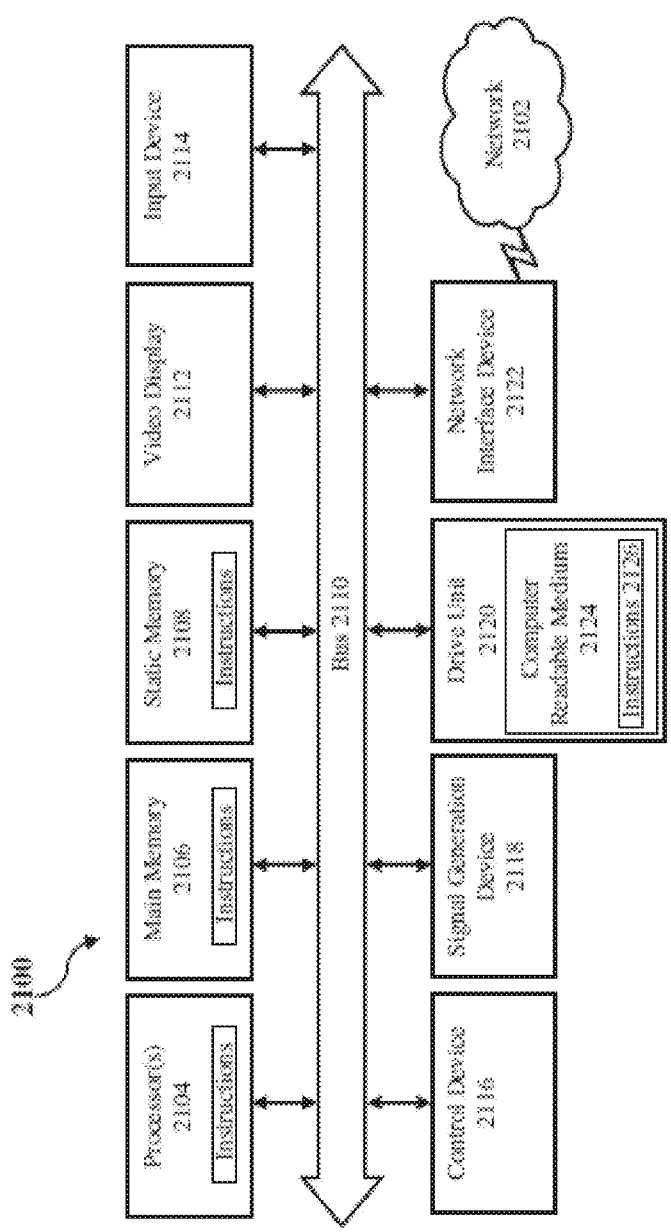
FIG. 15 shows an exemplary embodiment of the systems, apparatuses, and devices, according to an aspect of the present disclosure.

FIG. 15 is an exemplary embodiment of the systems, apparatuses, and devices described herein. Any of the systems, apparatuses, and devices may include any combinations of the features shown in FIG. 15, as well as any additional or alternative features as generally understood in the art. For example an exemplary embodiment of a system is generally shown at 2100 in FIG. 15. The exemplary system 2100 of FIG. 15 is hereinafter referred to as computer system 2100 for convenience. The computer system 2100 may include a set of instructions that can be executed to cause the computer system 2100 to perform any one or more of the methods or computer based functions disclosed herein. The computer system 2100 may operate as a standalone device or may be connected, for example, using a network 2102, to other computer systems or peripheral devices.

In a networked deployment, the computer system 2100 may operate in the capacity of a server or as a client user computer in a server-client user network environment, a client user computer in cloud computing environment, or as a peer computer system in a peer-to-peer (or distributed) network environment. The computer system 2100 can also be implemented as or incorporated into various devices, such as a stationary computer, a mobile computer, a personal computer (PC), a laptop computer, a tablet computer, a wireless smart phone, a set-top box (STB), a personal digital assistant (PDA), a global positioning satellite (GPS) device, a communications device, a control system, a camera, a web appliance, a network router, switch or bridge, or any other machine capable of executing a set of instructions (sequential or otherwise) that specify actions to be taken by that machine. For example, the computer system 2100 may be implemented as, or incorporated into, an automobile or a wearable device, such as, but not limited to, watches, glasses, bracelets, and headsets. The computer system 2100 can be incorporated as or in a particular device that in turn is in an integrated system that includes additional devices. In a particular embodiment, the computer system 2100 can be implemented using electronic devices that provide voice, video or data communication. Further, while a single computer system 2100 is illustrated, the term "system" shall also be taken throughout the present disclosure to include any collection of systems or sub-systems that individually or jointly execute a set, or multiple sets, of instructions to perform one or more computer functions.

As illustrated in FIG. 15, the computer system 2100 includes a processor 2104. The processor 2104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 2104 is an article of manufacture and/or a machine component. The processor 2104 is configured to execute software instructions in order to perform functions as described in the various embodiments herein. The processor 2104 may be a general purpose processor or may be part of an application specific integrated circuit (ASIC). The processor 2104 may also be a microprocessor, a microcomputer, a processor chip, a controller, a microcontroller, a digital signal processor (DSP), a state machine, or a programmable logic device. The processor 2104 may also be a logical circuit, including a programmable gate array (PGA) such as a field programmable gate array (FPGA), or another type of circuit that includes discrete gate and/or transistor logic. The processor 2104 may be a central processing unit (CPU), a graphics processing unit (GPU), or both. Additionally, any processor described herein may include multiple processors, parallel processors, or both. Multiple processors may be included in, or coupled to, a single device or multiple devices.

Moreover, the computer system 2100 includes at least one of a main memory 2106 and a static memory 2108. The main memory 2106 and the static memory 2108 can communicate with each other via a bus 2110. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted.

As shown, the computer system 2100 may further include a video display device 2112, such as a liquid crystal display (LCD), an organic light emitting diode (OLED), a flat panel display, a solid state display, or a cathode ray tube (CRT). The video display device 2112 may be integrated with or physically separate from the components of the computer system 2100 described herein. For example, the video display device 2112 may comprise the display or signage.

Additionally, the computer system 2100 may include an input device 2114, such as a keyboard/virtual keyboard or touch-sensitive input screen or speech input with speech recognition. The computer system 2100 may also include a cursor control device 2116, such as a mouse or touch-sensitive input screen or pad, a microphone, etc. The computer system 2100 may also include a signal generation device 2118, such as a speaker or remote control, a disk drive unit 2120, and a network interface device 2122.

In a particular embodiment, as depicted in FIG. 15, the disk drive unit 2120 may include a computer-readable medium 2124 in which one or more sets of instructions 2126, e.g. software, can be embedded. Additionally or alternatively to the disk drive unit 2120, the computer system 2100 may comprise any additional storage unit, such as, but not limited to, a solid state storage or other persistent storage, which comprises the computer-readable medium 2124. Sets of instructions 2126 can be read from the computer-readable medium 2124. Further, the instructions 2126, when executed by a processor, can be used to perform one or more of the methods and processes as described herein. In a particular embodiment, the instructions 2126 may reside completely, or at least partially, within the main memory 2106, the static memory 2108, and/or within the processor 2104 during execution by the computer system 2100.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A stock management system, comprising:
   a mat that includes a plurality of sensors corresponding to a plurality of sensing areas, each of sensors is configured to sense an item placed on a certain sensing area;
   partitions that define a plurality of lanes on the mat; and
   a controller that receives sensing results of the plurality of the sensors and calculates a stock level of remained items on the mat based on the sensing results, wherein
   one of the sensing areas is located in both of two lanes of the plurality of lanes, and
   the controller is configured to eliminate sensing results of sensing areas located under a partition provided on the mat when calculating the stock level.

2. The stock management system according to claim 1, wherein
   the stock level includes a number of remained items on the mat or a rate of remained items on the mat.

3. The stock management system according to claim 1, wherein
   a width of one of the sensing areas is smaller than a width of one of the lanes defined by the partitions.

4. The stock management system according to claim 1, wherein
   the certain sensing area is smaller than the item placed on the certain sensing area when viewed from a direction perpendicular to the mat.

5. The stock management system according to claim 1, further comprising:

a memory that stores position information with respect to the partitions placed on the mat, wherein the controller is configured to calculate a number of items on the mat based on the sensing results from the plurality of the sensors and the position information.

6. The stock management system according to claim 5, wherein the memory is further configured to store a maximum number of items placed on the mat, and the controller is further configured to calculate a stock level of remained items on the mat based on the maximum number and the received sensing results.

7. A stock management system, comprising:

a processor; and a memory storing instructions, that when executed by the processor, cause the processor to perform operations including:

receiving sensing results by sensors arranged on a mat in an array including rows and columns corresponding to arrayed sensing areas, each sensor sensing an item placed on each sensing area, a bottom plane of the item being greater than the sensing area on which the item is placed;

calculating a number of items placed on the sensors in accordance with the received sensing results including positive sensing results, the calculated number of the items being fewer than a number of positive sensing results, included in the received sensing results, each positive sensing result indicating that an item is on a sensor, and eliminating received sensing results corresponding to sensing areas located under a partition provided on the mat when calculating a stock level of items on the mat.

8. The stock management system according to claim 7, wherein the partition is a plurality of partitions defining a plurality of lanes substantially parallel to the columns in the array, and the operations further include:

inputting position information for the plurality of partitions positioned on the sensors arranged on the mat.

9. The stock management system according to claim 8, wherein the operations further include:

determining that at least one of sensors is not used for calculating the number of items placed on the sensors.

10. The stock management system according to claim 9, wherein the at least one of the sensors senses an item placed on a sensing area positioned under one of the plurality of partitions.

11. The stock management system according to claim 8, wherein the operations further include:

calculating the number of items on a first lane of the plurality of lanes in accordance with a first portion of received sensing results corresponding to first sensors positioned in the first lane and a second portion of received sensing results corresponding to second sensors positioned in a second lane next to the first lane.

12. The stock management system according to claim 11, wherein the operations further include:

eliminating received sensing results by first and second sensors positioned in both the first lane and the second lane when calculating the number of items on the first lane.

13. The stock management system according to claim 11, wherein the stock level includes a number of remained items on the mat or a rate of remained items on the mat.

14. A stock management system, comprising:

a processor; and a memory storing instructions, that when executed by the processor, cause the processor to perform operations including:

receiving sensing results by sensors arranged on a mat in an array including rows and columns corresponding to arrayed sensing areas, each sensor sensing an item placed on each sensing area, an area of the item being greater than the sensing area on which the item is placed;

calculating a number of items placed on the mat in accordance with received results, the calculated number of items being less than a number of positive sensing results included in the received sensing results and indicating that an item is on one of sensors, and eliminating received sensing results corresponding to sensing areas located under a partition provided on the mat when calculating when calculating a stock level of items on the mat.

15. The stock management system according to claim 14, wherein the stock level includes a number of remained items on the mat or a rate of remained items on the mat.

* * * * *